May 27, 1952

B. R. GOSSICK 2,598,252

BALANCE CONTROL FOR METAL DETECTION
AND INSPECTION EQUIPMENT

Filed Feb. 3, 1948

INVENTOR
Ben R. Gossick
BY
ATTORNEY

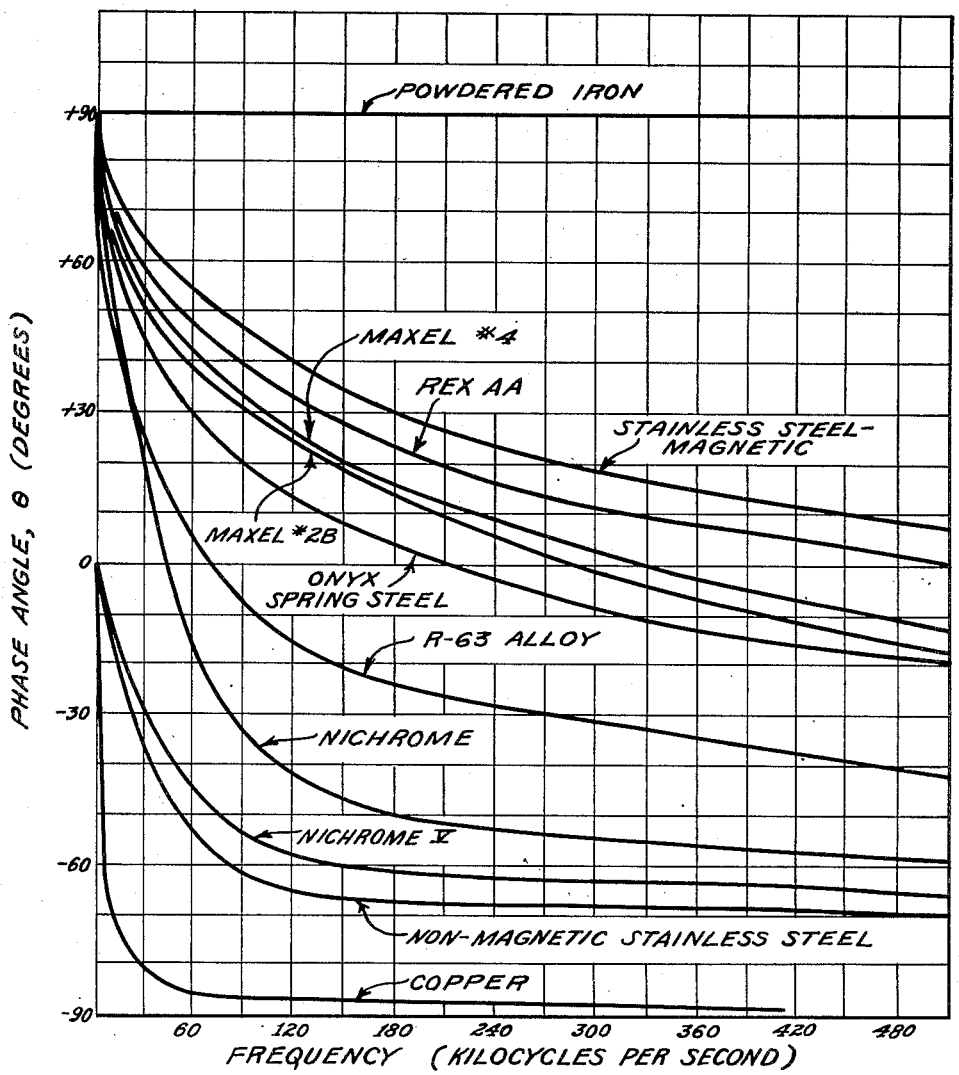

Patented May 27, 1952

2,598,252

UNITED STATES PATENT OFFICE 2,598,252

BALANCE CONTROL FOR METAL DETECTION AND INSPECTION EQUIPMENT

Ben R. Gossick, Oak Ridge, Tenn., assignor to Radio Corporation of America, a corporation of Delaware Application February 3, 1948, Serial No. 6,047

4 Claims. (Cl. 323—45)

The present invention relates to apparatus of the type in which two magnetically coupled circuits are so arranged that a normally balanced energy transfer relation is established and having a device associated with one of said circuits to indicate a deviation from the condition of balance, the present application being a continuation in part of my copending application Serial No. 742,672, filed April 19, 1947, now abandoned, for "Tuning Controls for Metal Detection and Inspection Equipment." Devices of this type have been used for many purposes including subsurface investigation to locate metallic deposits or mines, detection of faults in large metallic objects, and the detection of small foreign objects in all types of electrically non-conducting materials such as foods, textiles, tobacco products, plastics and the like. While the principle of operation of the present invention is common to all such devices, its application to an improved industrial metal detector will be described to illustrate the invention.

A metal detector or inspection machine of the general type contemplated has been described and claimed in a copending application, Serial No. 568,045, filed December 13, 1944, by J. H. Reynolds, now Patent No. 2,513,745, issued July 4, 1950, for Metal Detectors, which is assigned to the same assignee as the present application. The general principle of operation of devices of this type, insofar as the present invention is concerned, involves the establishment of induced alternating voltages which are normally of equal amplitude and opposite phase. This may be accomplished, for example, by applying alternating currents to a primary coil to establish a magnetic field and positioning two secondary coils in the field, the secondary coils being connected in opposition and so spaced that the induced voltages are normally equal and opposite. Alternatively, two magnetic fields may be established by a pair of primary coils in symmetrical coupling relation to a single secondary or to two secondary windings connected in opposition. The initial operating condition is normally a null balance.

In order to indicate or detect a metal particle, the material being tested is passed between the primary and secondary coils by any convenient means, such as a fabric conveyor belt. It is well known that the magnetic field around a coil extends a considerable distance and that any conductor or magnetic material brought into this field will distort it. Distortion may be due to the magnetic permeability of the metal or due to the magnetic field produced by currents induced in the object if it is conductive. Consequently, the initial balance, which is very critical, will be upset by any object having electrical properties of permeability or conductivity which is placed in the field of the device, even at a considerable distance from the device.

The sensitivity of a metal detector to small disturbances of the magnetic field depends primarily upon the perfection of the initial balance, and the maintenance of high sensitivity under conditions of vibration and changes in temperature normally encountered requires a high degree of stability. Theoretically, a perfect balance can be obtained by a careful orientation of identical coils. However, it is necessary as a practical matter to place the coils in shielding containers to limit the coupling field to the space immediately between the coils so as to prevent adjacent objects and operating personnel from upsetting the critical balance. It has been found that it is impractical to construct shields and coils with sufficiently accurate tolerances to provide a null of the order required for sensitive operation. Consequently, either one or both of these sources of non-uniformity tend to introduce into the secondary a residual voltage which cannot be balanced out by merely shifting the positions of the coils. This residual voltage may be the resultant of a number of complex voltages of random phase angle.

It is, therefore, the primary object of this invention to provide means for balancing out the undesired residual voltage of random phase so as to produce maximum operating sensitivity. A further object of this invention is to accomplish this result by means of an arrangement which is extremely simple to manipulate and stable in operation.

It is a further object of this invention to provide means for balancing magnetically coupled circuits to minimize effectively all energy transfer between the circuits.

It is a still further object of this invention to provide an improved detector of magnetic or conductive materials.

In brief, the foregoing objects, as well as additional objects which will appear subsequently, are accomplished by establishing in the secondary two independent compensating voltages in relative phase quadrature and of adjustable amplitude. This may be done by placing in the coupling field of the system to be balanced one or more devices which distort the coupling field so as to produce in the output circuit compensating voltages in phase quadrature. After the best possible balance has been obtained by orienting the primary and secondary coils, any remaining residual voltage can be eliminated by adjusting these devices. Since there is no reaction between them, a complete balance is obtained after two adjustments. As a preferred embodiment of this invention, these balancing devices are simple metal slugs of dissimilar metals having electrical characteristics which will be pointed out in detail hereinafter.

The novel features that are considered characteristic of this invention are set forth with particularity in the appended claims. The invention, both as to its organization and method of operation, as well as additional objects and advantages thereof, will best be understood from the following description when read in connection with the accompanying drawings, in which Figures 1a to 1e are conventional balanced coupling circuits used to explain the theory of operation of this invention;

Figure 8 is a graph showing certain electrical properties of a number of metals.

Figure 1A:
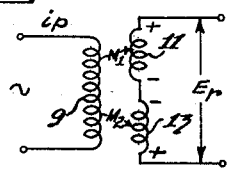
Figure 2:
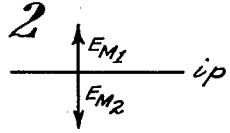
Figures 2 to 4 are vector diagrams used to explain the invention.

Balanced coil coupling systems of the type contemplated herein may take any of several forms. In Fig. 1a, for example alternating current from a source not shown is applied to primary coil 9. Two secondary coils 11 and 13 of identical construction are connected in series and so oriented with respect to the primary that voltages $E_{M1}$ and $E_{M2}$ of equal amplitude and opposite phase are induced in the two coils, as shown in Fig. 2, wherein the primary current $i_p$ is taken as the reference. The coefficients of coupling, $M_1$ and $M_2$, are equal in such a case, as is well known. Under ideal conditions, the resultant output voltage $E_r$ will equal zero.

Figure 1B:
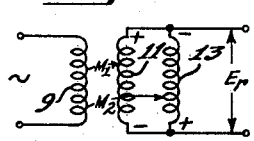

Alternatively, secondary coils 11 and 13 may be connected in parallel as shown in Fig. 1b. If $M_1=M_2$ and the coils are properly oriented, $E_r$ is zero in this case also.

Figure 1C:
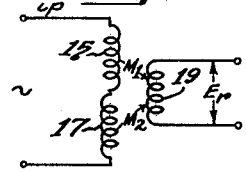
Figure 1D:
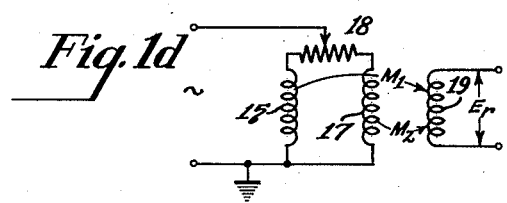
Figure 1E:
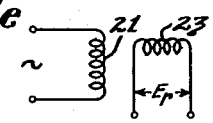

In still another system two primary coils 15 and 17 are employed with a single secondary coil 19, as in Fig. 1c. In this case $M_1=M_2$ and again the resultant output voltage $E_r$ is zero. Or primary coils 15 and 17 may be connected in parallel as shown in Fig. 1d, and a single secondary coil so oriented that $M_1=M_2$ and $E_r=0$. As shown in the patent to J. H. Reynolds referred to above, potentiometer 18 may be employed to adjust the currents through the two primary coils. Finally a single primary 21 may be utilized with a single secondary 23 positioned so as to minimize the coupling, as shown in Fig. 1e. In this case $M=0$ until the magnetic field is distorted by some external object.

In the above, the theoretical case has been assumed. In actual practice $E_r$ has a relatively large finite value due to inherent dissymmetries in the circuits and coils, physical orientation, and distortion of the field due to adjacent metallic objects such as circuit components, wires or shields. Nor can the resultant voltage be eliminated by any amount of adjustment of the coil positions, because different causes of dissymmetry introduces different amounts of phase shift into the system. Thus the resultant residual voltage must be considered as the vector sum of a large number of component voltages whose individual phase angles may be widely different depending upon the nature of the errors which produced them.

Previously known balancing methods have involved the successive adjustment of coil position, circuit resistance and circuit reactance, the latter usually being accomplished by varying capacitors connected in circuit with the coils to tune them to or near resonance at the operating frequency. This system is tedious and difficult, because each adjustment of one component changes the others. That is, the controls used in previously known systems were electrically interlocked. Furthermore, a balance once obtained by such methods was extremely unstable. Slight changes in temperature, for example, affect circuit resistance, inductance and capacitance in different amounts so that the system was easily unbalanced. And yet satisfactory performance with high sensitivity and stable operation can only be achieved when a complete and accurate null or balance is obtained.

Figure 3:
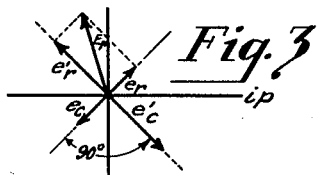

It can be shown that any vector voltage such as $E_r$ in Fig. 3, can be resolved into two vector components $e_r$ and $e_r'$, in relative phase quadrature. Consequently, if two compensating vector voltages $e_c$ and $e_c'$ of equal amplitude and opposite phase with respect to the vector components are combined with the resultant voltage $E_r$, it will be completely balanced out or neutralized. Thus it is a further object of this invention to provide balancing devices for a normally substantially balanced coupled circuit for introducing into the system two voltages of controllable amplitude and in phase quadrature for balancing out the undesired residual voltage produced by unavoidable dissymmetries of the system. As a result of the quadrature phase relationship, the operation of these devices will be independent of each other, and a final and complete null can be obtained by adjusting one device for minimum output and then the other, only one adjustment of each being required. The advantage of this two-step method over the old balance and rebalance interlocked system will be apparent.

It was discovered that when different metals were brought into the coupling field that the resulting unbalance voltages in the secondary had different phase angles. An investigation was then made to determine the characteristics of the metals which controlled the phase of the resultant voltage, and a theoretical analysis was also made. A complete analysis of the factors affecting the electrical performance of a number of metals is contained in my copending application, Serial No. 6,046, filed February 3, 1948, for Metal Slug Resonator, now Patent No. 2,560,946, issued July 17, 1951.

Figure 4:
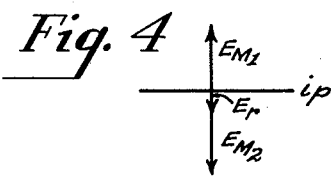

It is known that all metals have in varying degrees at least one of the two properties of conductivity and permeability. A conventional core of comminuted paramagnetic material such as is commonly used in radio receivers, has negligible conductivity, and high permeability. The effect of introducing such a "powdered iron" core into the field of a coil is well known also. Introducing a core predominantly into the field $M_2$ of Fig. 1a, for example, will increase the coupling between primary coil 9 and secondary coil 13, so that the amplitude of the voltage $E_{M2}$, Fig. 4, increases. Thus the resultant voltage $E_r$ is equal to $E_{M1}-E_{M2}$, and is in phase with the latter. $E_r$ can be expressed $$E_r = j\omega(M_1 - M_2)i_p \quad (1)$$

Figure 5:
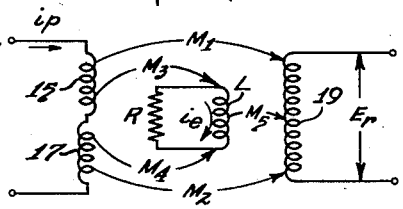
Figure 5 is the equivalent circuit of a coupled circuit including a metal slug in the coupling field.

The effect of a non-magnetic conductor in a magnetic field was determined by placing samples of non-magnetic conductive material within coupled coils connected as shown in Fig. 1c although any equivalent circuit could be used. In this case, the magnetic field induces a circulating current in the conductor which flows in a direction at right angles to the flux. The current path has effective properties of resistance and inductance. This is therefore equivalent to a small inductance L in series with a resistance R through which an induced eddy current $i_e$ flows, as shown in Fig. 5.

When $M_3 = M_4$, there is no voltage induced in the secondary 19 through the coupling $M_5$. But if the conductive object is moved so that $M_3$ predominates, for example, then an eddy current $i_e$ flows in it. This current induces in the secondary 19, through the coupling $M_5$, a voltage $E_r'$ whose phase, with respect to the primary current $i_p$, depends on the values of R and L of the sample for the frequency of operation. The voltage may be expressed $$E_r' = \omega M_5 i_e \quad (2)$$

and $$i_e = \frac{e_m}{Z} = \frac{-\omega(M_3 - M_4)i_p}{R + j\omega L} \quad (3)$$

where $e_m$ is the voltage induced in the material and $Z$ the impedance of the current path.
Thus $$E_r = \frac{-\omega^2 M_5(M_3 - M_4)i_p}{R + j\omega L} \quad (4)$$

Multiplying numerator and denominator by $R - j\omega L$ $$E_r = \frac{-\omega^2 M_5(R - j\omega L)(M_3 - M_4)i_p}{R^2 + \omega^2 L^2} \quad (5)$$

Consequently, the vector voltage for a non-magnetic conductor will fall either in the 2nd or 4th quadrant, depending on the sign of the difference between $M_3$ and $M_4$.

The net result produced by the shield, wiring conductors, screws and other components of the apparatus in the coil field, is a complex resultant residual voltage which may have any phase angle with respect to the primary current $i_p$, considered as a reference. That is, the residual voltage may lie in any quadrant. To balance out this residual voltage, it is therefore necessary to introduce a compensating voltage adjustable in magnitude and controllable in phase throughout substantially 360°. Metal objects having both magnetic permeability and conductivity will produce a resultant effect approximately equal to the vector sum of the individual effects of the two properties considered separately. Thus, depending on the relative magnitudes of the permeability and conductivity of different objects and on the location of the object in the coupling field, a resultant vector voltage may be induced in the secondary which may lie in any quadrant.

The characteristics of various metals which combined to produce the undesired residual voltage are now used, in accordance with this invention, to provide the compensating voltages in relative phase quadrature which, as pointed out above, combined to produce a single resultant compensating voltage equal and opposite to the undesired residual voltage.

Two metal slugs are selected, each having the proper balance between permeability and conductivity so that the vector voltage induced in the secondary by one is in phase quadrature with the voltage induced in the secondary by the other. Under these conditions there will be no reaction between the two. By moving the slugs with respect to the balanced fields the amplitudes of the two voltages can be controlled, and bringing the slugs predominantly into one field or the other, the phase of the voltage produced by each can be reversed 180°. Thus a compensating voltage of any desired phase and amplitude can be obtained, and a complete and accurate balance reached.

An empirical method of selecting materials may be employed. For example, identical cylindrical metal slugs ⅜" in diameter and ½" long were made up and tested to determine the magnitude and phase angle of the resultant induced voltage. For convenience, the phase angles were measured with respect to the phase of the voltage produced by a powdered iron slug. Typical results are tabulated in Table I below.

TABLE I

| Materials | 18 Kilocycles | | 36 Kilocycles | | 72 Kilocycles | |
|---|---|---|---|---|---|---|
| | Relative Magnitude | Phase angle (In Degrees) | Relative Magnitude | Phase angle (In Degrees) | Relative Magnitude | Phase Angle (In Degrees) |
| Copper | 3.0 | −84 | 6.0 | −86 | 11.4 | −88 |
| Aluminum | 2.9 | −78 | 6.1 | −82 | 11.3 | −86 |
| Brass | 2.75 | −74 | 5.5 | −78 | 10.7 | −84 |
| Non-Magnetic Stainless Steel FM 18-8: | | | | | | |
| Type 303 | 1 | [1] −34 | 3.1 | [1] −50 | 6.8 | [1] −63 |
| Maxel 2B | 6.2 | [1] 56 | 9.3 | [1] 40 | 11.8 | [1] 27 |
| Maxel No. 4 | 6.9 | 58 | 10.3 | 42 | 13.8 | 27 |
| Airdi | 8.1 | 60 | 13.0 | 48 | 16.2 | 39 |
| Rex A A | 7.2 | 60 | 11.9 | 48 | 14.4 | 39 |
| Powdered Iron with an Insulating Bond | 7.5 | 90 | 15.0 | 90 | 26.2 | 90 |

[1] Difference ≈ 90°.

It will be observed that the difference between the phase angles of the voltages produced by Stainless Steel Type 303 steel and Maxel 2B is approximately 90° for all frequencies indicated. Consequently, these metals are highly satisfactory for the purpose. The chemical analysis of the selected metals is as follows:

TABLE II

*Non-Magnetic Stainless Steel, Type 303*

| | Per cent |
|---|---|
| Chromium | 17–19 |
| Nickel | 7–9 |
| Iron | Balance |

*Maxel 2B*

| | Per cent |
|---|---|
| Carbon | 0.40 |
| Manganese | 1.09 |
| Phosphorus | 0.020 |
| Sulphur | 0.08 |
| Silicon | 0.3 |
| Nickel | 0.37 |
| Chromium | 0.22 |
| Molybdenum | 0.15 |
| Iron | Balance |

A more accurate and comprehensive investigation was made to determine the behavior of similar metal cylinders over a wider range of frequency. Fig. 8 is a chart showing graphically the phase angle $\theta$ as a function of frequency for a number of metal slugs ⅜ inch in diameter and ½ inch long in each case. These curves demonstrate clearly that copper and stainless steel slugs cause voltages to be induced in the secondary which have a negative phase angle for all frequencies. Aluminum and brass behave so much like copper that it was impractical to show separate curves. However, metals which have a magnetic permeability greater than unity have a positive phase angle at low frequencies and a negative phase angle at higher frequencies, the phase angle curve crossing the zero phase angle line at higher frequencies as the permeability and resistivity increase. Powdered iron, having a very high permeability, and being substantially non-conductive, has a phase angle which is substantially constant at +90°. Ketos steel behaved like Maxel No. 2B. Airdi Steel behaved like Rex AA Steel. Consequently, separate curves for these metals have not been shown.

It will now be clear that there is a wide choice of metals from which to select the two having the desired quadrature phase relationship for balancing a magnetically coupled circuit. Thus by scaling off a distance equal to 90° on the ordinate of Fig. 8, and measuring the distance between various curves for different frequencies, many combinations of metals can be found. For example, the combinations indicated in Table III, at the frequencies shown, all have the necessary 90° relationship. This list is by no means complete, and serves only to illustrate the wide choice which may be exercised. Curves similar to those of Fig. 8 can readily be made for slugs of a different size or shape, and for other alloys, and the same procedure followed. Of course the frequency of operation may be adjusted to that value which results in the proper phase relation for the selected metals, or the frequency of operation may be chosen at a convenient value and the size, shape or material of the slugs varied to produce the quadrature relationship.

TABLE III

| | |
|---|---|
| Magnetic stainless steel and non-magnetic stainless steel at | 15.0 kc. |
| Nichrome V and magnetic stainless steel at | 25.0 kc. |
| Rex AA or Airdi and non-magnetic stainless steel at | 30.0 kc. |
| Maxel No. 4 and non-magnetic stainless steel at | 45 to 125 kc. |
| Maxel 2B or Ketos and non-magnetic stainless steel at | 55 kc. to 110 kc. |
| R–63 Alloy and copper at | 60.0 kc. |
| Nichrome and copper at | 35.0 kc. |
| Nichrome and powdered iron at | 40.0 kc. |
| R–63 Alloy and powdered iron at | 70.0 kc. |
| Onyx spring steel and powdered iron at | 210.0 kc. |
| Maxel 2B or Ketos and powdered iron at | 290.0 kc. |
| Maxel No. 4 and powdered iron at | 335.0 kc. |

Table IV gives the chemical analysis of the various alloys to which reference has been made herein:

TABLE IV

| Metal | Percent Chemical Analysis |
|---|---|
| Copper | Cu. |
| Aluminum | Al. |
| Brass | Cu 66. Zn 34. |
| Non-magnetic Stainless Steel Type 303 | Cr 17–19. Ni 7–9. Bal Fe. |
| Nichrome V | Ni 80. Cr 20. |
| Nichrome | Ni 61. Cr 15. Bal Fe. |
| R–63 Alloy | Mn 4. Si 1. Bal Ni. |
| Onyx Spring Steel | C .95. Bal Fe. |
| Maxel 2B | C .40. Si .30. Cr .22. Mn 1.09. Ni .37. Mo .15. Bal Fe. |
| Ketos | C .90. W .50. Mn 1.25. Cr .50. Bal Fe. |
| Maxel No. 4 | C .75. Cr .50. Mn .85. Bal Fe. |
| Rex AA | W 18. V 1.1. Cr 4. Bal Fe. |
| Airdi | C 1.50. Cr 11.5. V .20. Mo .80. Bal Fe. |
| Stainless Steel (Magnetic) FM-2 Type 416 | C 0.15. Mn 1.25. Si 1.00. P4 0.04. S8 0.07. Cr 12–14. Mo 0.60. Bal Fe. |

In my copending application, Serial No. 6,046, filed February 3, 1948, for Metal Slug Resonator, now Patent No. 2,560,946, issued July 17, 1951, there has been included an extensive theoretical analysis of the effect of variations of shape, size and electrical properties of the metal slugs. The equations derived therein may be employed to determine the performance of a given slug where the characteristics of a slug differing in one or more of its properties are known.

Figure 6:
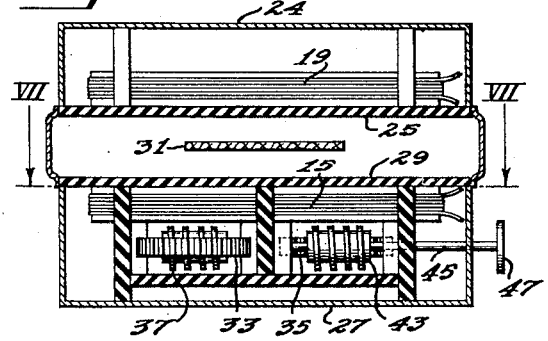
Figure 6 is an elevation, partly in section, of a balanced coil coupling system in accordance with this invention.
Figure 7:
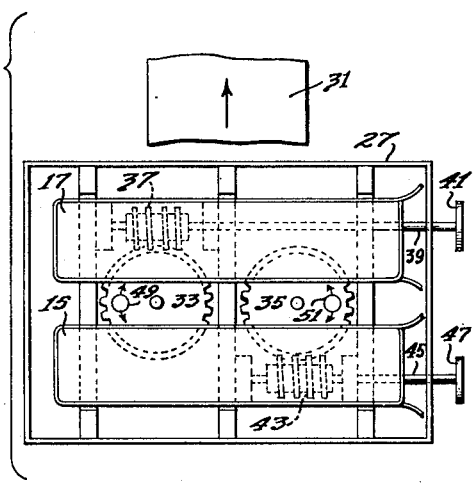
Figure 7 is a plan view taken on the line VII—VII of Fig. 6.

Figs. 6 and 7 illustrate a preferred embodiment of this invention. Secondary coil 19 is mounted in upper shielding compartment 24, the lower face of which is open. Sheet 25, of insulating material, covers the open face to protect the coil.

Directly beneath the secondary is a similar shielding compartment 27, having its open upper face covered by sheet 29, also of insulating material. The two compartments are rigidly mounted in spaced relation. Fabric belt 31 passes between them and carries the articles to be inspected.

Within the lower compartment there are two identical primary coils 15 and 17 lying side-by-side and equidistant from the secondary 19. Just beneath the two primary coils there are two Bakelite gears 33 and 35. The first is meshed with worm gear 37 and driven by shaft 39 which carries adjusting knob 41. The second is meshed with worm gear 43 driven by shaft 45 which carries adjusting knob 47. All these parts are made of insulating material.

A first balancing device comprising metal slug 49 is mounted in gear 33 while the other device 51 of dissimilar metal is mounted in gear 35. Both gears rotate about axes which are parallel to the coil axes and equidistant therefrom. The slugs are therefore adapted for movement from a normal neutral position midway between the coils toward one or the other coil, in response to the rotation of adjusting knobs 41 and 47.

As stated above, both slugs have combined properties of conductivity and permeability which are so proportioned that the phase angles of the voltages induced in the secondary are in relative phase quadrature. The slugs should preferably present a constant current path to induced eddy currents as they are moved. Thus the slug dimension at right angles to the flux direction should remain constant as the slug is moved. A sphere is theoretically ideal for this reason, as this would permit unlimited freedom of orientation and rotation without changing the current path. In the embodiment illustrated the movement is limited to a plane so that a cylindrical slug is satisfactory since its axis is parallel to the direction of the flux lines at all times and the current path is therefore at right angles to the cylinder axis, a dimension which is uniform.

The source of power for the primary coil or coils and the indicator or detector have not been illustrated, since these elements are conventional. It is to be understood that the various coil arrangements illustrated in Fig. 1 may be employed, as is well known.

What I claim is:

1. A device of the character described comprising a pair of spaced coils lying substantially in a plane and having parallel axes, a third coil in spaced relation and equally coupled to said pair of coils, means for energizing said pair of coils with high frequency alternating current, so that voltages of substantially equal amplitude and opposite phase are induced in said third coil; inherent dissymmetries in said coils causing an undesired residual voltage to be induced in said third coil; and two balancing devices located in the magnetic fields produced by said pair of coils and adjustable in position so as to affect primarily the field produced by one or the other of said pair of coils as desired.

2. A device of the character described in claim 1 in which one of said balancing devices has electrical and physical characteristics such that it causes a first compensating voltage to be induced in said third coil, and the other of said devices has electrical and physical characteristics such that it causes a second compensating voltage to be induced in said third coil in phase quadrature with said first compensating voltage, the position adjustment of said devices affecting only the amplitudes of said compensating voltages, respectively, whereby an undesired residual voltage of any phase and magnitude can be neutralized by a combination of said compensating voltages.

3. A device of the character described in claim 2 in which said balancing devices comprise metal slugs of dissimilar metals.

4. A device of the character described in claim 3 in which said slugs are shaped so as to present a constant impedance to the flow of eddy currents induced therein throughout the range of adjustment.

BEN R. GOSSICK.

REFERENCES CITED

The following references are of record in the file of this patent:

UNITED STATES PATENTS

| Number | Name | Date |
|---|---|---|
| 1,992,100 | Stein | Feb. 19, 1933 |
| 2,155,267 | Hathaway | Apr. 18, 1939 |
| 2,321,355 | Berman | June 8, 1943 |
| 2,321,356 | Berman | June 8, 1943 |
| 2,437,455 | Berman | Mar. 9, 1948 |

OTHER REFERENCES

Induction Prospecting for Shallow Ore Deposits and Small Metallic Objects by Joyce, J. W., United States Bureau of Mines, October 1935, Fig. 12.